(12) United States Patent
Lemelin et al.

(10) Patent No.: US 9,555,614 B2
(45) Date of Patent: Jan. 31, 2017

(54) METHOD FOR QUANTIFYING BLANKET PERFORMANCE AND PRINTING PRESS

(71) Applicant: Goss International Americas, Inc., Durham, NH (US)

(72) Inventors: Michael Lemelin, Madbury, NH (US); James Brian Vrotacoe, Barrington, NH (US); Michael Raymond Rancourt, Merrimack, NH (US); William David Mellencamp, Dover, NH (US)

(73) Assignee: GOSS INTERNATIONAL AMERICAS, INC., Durham, NH (US)

( * ) Notice: Subject to any disclaimer, the term of this patent is extended or adjusted under 35 U.S.C. 154(b) by 0 days.

(21) Appl. No.: 14/681,765

(22) Filed: Apr. 8, 2015

(65) Prior Publication Data

US 2015/0290925 A1   Oct. 15, 2015

Related U.S. Application Data

(60) Provisional application No. 61/977,920, filed on Apr. 10, 2014.

(51) Int. Cl.
| | |
|---|---|
| *B41F 33/00* | (2006.01) |
| *G01L 5/00* | (2006.01) |
| *B41F 3/58* | (2006.01) |
| *B41F 33/02* | (2006.01) |
| *B41F 33/08* | (2006.01) |
| *B41F 33/14* | (2006.01) |
| *B41F 13/004* | (2006.01) |

(52) U.S. Cl.
CPC ............ *B41F 3/58* (2013.01); *B41F 13/0045* (2013.01); *B41F 33/0072* (2013.01); *B41F 33/02* (2013.01); *B41F 33/08* (2013.01); *B41F 33/14* (2013.01); *G01L 5/0085* (2013.01); *B41F 33/00* (2013.01); *B41F 33/0009* (2013.01)

(58) Field of Classification Search
CPC ... B41F 33/0072; B41F 33/00; B41F 33/0009; B41F 33/04–33/16; G01L 5/0085
See application file for complete search history.

(56) References Cited

U.S. PATENT DOCUMENTS

| | | | |
|---|---|---|---|
| 6,230,622 B1 * | 5/2001 | Dilling | B41F 33/0009 101/349.1 |
| 6,272,986 B1 * | 8/2001 | Hess | 101/137 |

(Continued)

FOREIGN PATENT DOCUMENTS

| | | |
|---|---|---|
| DE | 102005023482 B3 | 11/2006 |
| DE | 102010006782 A1 | 8/2011 |
| WO | 2008/028516 A1 | 3/2008 |

*Primary Examiner* — Robert Huber
*Assistant Examiner* — John M Royston
(74) *Attorney, Agent, or Firm* — Davidson, Davidson & Kappel, LLC

(57) ABSTRACT

A method for determining blanket performance in a printing press is provided. The printing press includes a plate cylinder having a printing plate transferring an image to a blanket on a blanket cylinder for printing on a substrate. The method includes determining an acceptable range of nip force (Fp) between a plate cylinder and a blanket cylinder in a printing unit, calculating the nip force (Fp) between the plate cylinder and blanket cylinder and determining blanket performance based on the nip force with respect to the acceptable range of nip force. A printing press is also provided.

15 Claims, 3 Drawing Sheets

(56) References Cited

U.S. PATENT DOCUMENTS

| | | | |
|---|---|---|---|
| 6,418,847 B1* | 7/2002 | Holecek | 101/232 |
| 6,433,499 B1 | 8/2002 | Cote et al. | |
| 6,499,639 B2 | 12/2002 | Cote et al. | |
| 7,617,773 B2 | 11/2009 | Schroeder et al. | |
| 2005/0273193 A1* | 12/2005 | Lindsey | 700/126 |
| 2008/0216697 A1* | 9/2008 | Takenouchi et al. | 101/484 |
| 2010/0024673 A1* | 2/2010 | Schneider et al. | 101/477 |
| 2012/0193870 A1 | 8/2012 | Taig | |
| 2013/0269555 A1* | 10/2013 | LeFevre et al. | 101/335 |

* cited by examiner

METHOD FOR QUANTIFYING BLANKET PERFORMANCE AND PRINTING PRESS

Priority is hereby claimed to U.S. Provisional Application No. 61/977,920, the entire disclosure of which is hereby incorporated by reference herein.

BACKGROUND

The present invention relates generally to printing presses and more particularly to blanket cylinders.

U.S. Pat. No. 7,617,773, hereby incorporated by reference herein, discloses a device for determining incorrectly sized or manufactured blankets. The device includes a first blanket on a first blanket cylinder independently driven by a first motor, a first controller for determining torque values of the first motor, a second blanket on a second blanket cylinder independently driven by a second motor, a second controller for determining torque values of the second motor. A processor determines the existence of a size difference between the first and second blankets as a function of the torque values of the first and second motors.

U.S. Pat. No. 6,433,499, hereby incorporated by reference herein, discloses an apparatus for calibrating a tension transducer for a web that includes a pair of nip rollers and a motor for driving at least one of the pair of nip rollers, the motor having at least one roller output being a function of at least one of a motor torque and a motor velocity. A web tension transducer roll is located upstream of the nip rollers, the web tension transducer having a tension output being a function of the actual web tension of the web. A processor receives the at least one roller output and the tension output, the processor calculating a tension correction value as a function of the at least one roller output and the tension output.

U.S. Pat. No. 6,499,639, hereby incorporated by reference herein, discloses a method for dynamically controlling a driver of a nip roller in a web printing press includes controlling the speed of the driver in a tension-control mode during a phase of printing press operation and in a velocity-control mode during another phase of printing press operation. The controlling of the speed of the driver in the tension-control mode is based on the tension in the web upstream of the nip roller so as to maintain the tension at a desired tension value. The controlling of the speed of the driver in the velocity-control mode is based on a predetermined driver velocity ratio for maintaining the web tension.

BRIEF DESCRIPTION OF THE DRAWINGS

A preferred embodiment of the present invention will be elucidated with reference to the drawings, in which.

DETAILED DESCRIPTION OF A PREFERRED EMBODIMENT

Figure 1:
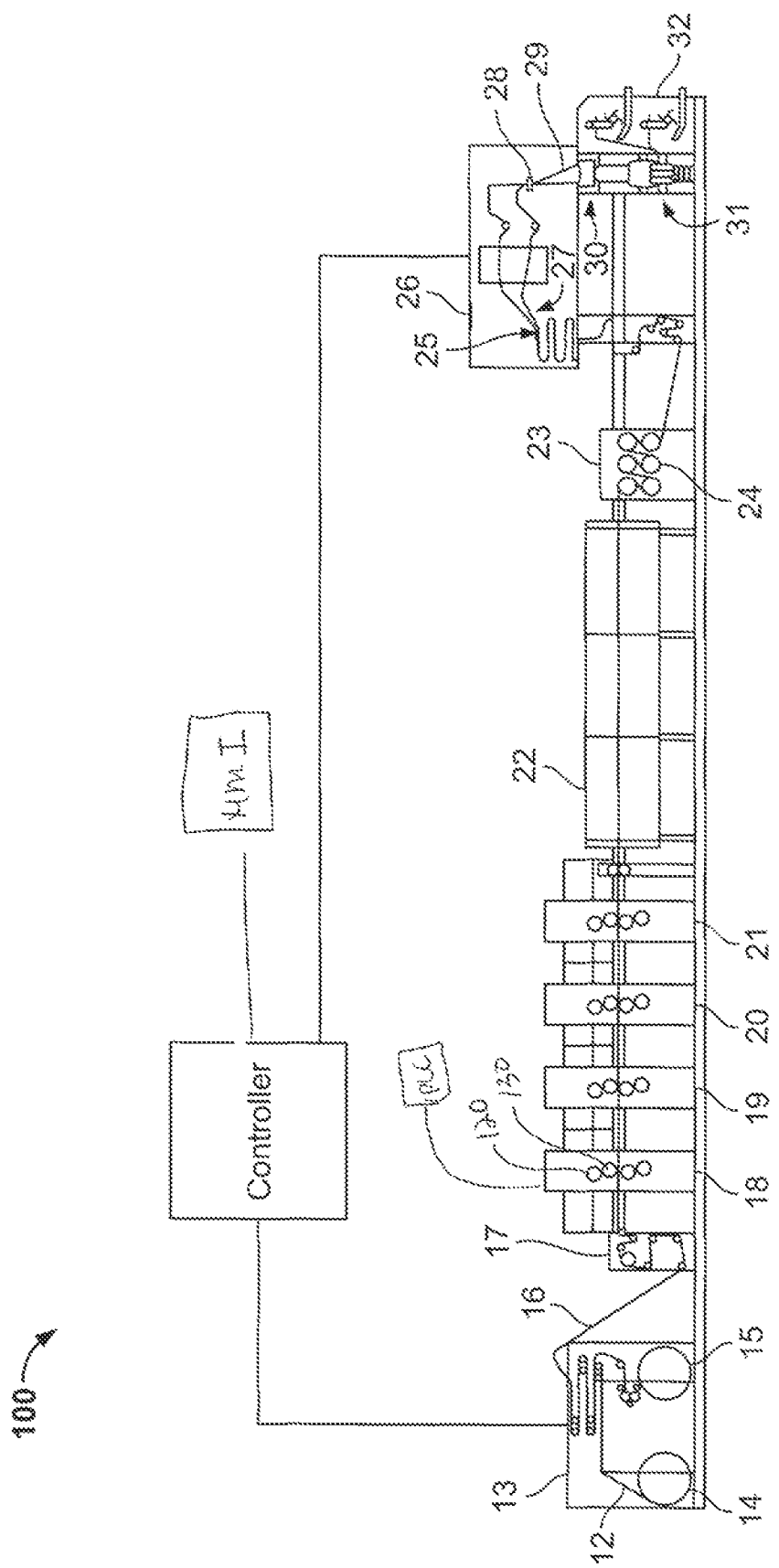
FIG. 1 shows a printing press according to a preferred embodiment of the present invention.

Torque differences between upper and lower blankets may be used to determine when a blanket should be swapped to another print unit or replaced. There are no known implementations that use nip force calculations as a metric to quantify blanket performance.

Known embodiments do not set specific limits on nip forces to be applied by the blanket on the plate and do not make specific calculations of nip forces. Attempts have been made to monitor torque of the blanket cylinder during operation.

A desired plate to blanket nip force allows the printing press to run continuously without either pulling the tail edge out, which occurs when nip forces are greater than the desired range, or pulling the lead edge out, which occurs when nip forces are below the desired range. A small negative nip force may be desirable in the direction that holds the plate on the cylinder.

The method utilizes a design setpoint specific to the printing unit which may be based on the size of the cylinders. The design setpoint may be, for example, −1 pli. An acceptable range of nip force tolerance is determined that provides for acceptable printing and maintaining proper printing plate mounting while running the press on impression.

The acceptable range of the nip force may be, for example, +/−4 pli, with respect to the design setpoint. In practice, the nip force may be lower and still allow acceptable press performance. However, positive nip forces may result in plate tail removal from the cylinder.

When the nip forces are outside the desired range the blanket can be removed and replaced before poor printing occurs or damage results in the printing unit or downstream printing units.

The present invention utilizes known and measurable dynamic and static parameters to calculate blanket to plate nip forces and a desirable nip force range of operation which is determined empirically. Further refinement of the nip force range may establish optimized blanket print performance.

The radius of the plate, rp, and the width of the press/plate, W, are required. These required static parameters are input to the control system as part of the job file or at the human machine interface HMI by an operator for a given print job.

The measured parameters include the average plate torque on impression, Ton, and the average plate torque off impression, Toff. The measured parameters are available in the motion controller via the programmable logic controller, PLC, for the printing unit which knows the state of the printing unit, for example, on or off impression.

The nip force Fp is calculated as follows:

$$Fp = -(Ton - Toff)/(rp \times W).$$

The desired nip force operating range is, for example, +/−4 pli from the design setpoint, but may also be, for example, +/−2 pli or +/−1 pli or any combination in between, for example, −2 pli ≤ Fp ≤ 0.25 pli. The control system response may be programmed so that if Fp > +4 pli+design setpoint or Fp < −4 pli+design setpoint, the printing unit controller can throw the printing unit off impression, stop the press, and post a fault message to the operator to replace the blanket. Thus, the nip force is used to determine the quality of the blanket. An unacceptable nip force signifies the need for a new blanket.

FIG. 1 shows a printing press 100 in accordance with an embodiment of the present invention. Printing press 100 is a perfecting, offset press having a plate cylinder and blanket cylinder on both sides of the substrate for printing on both sides of the substrate at the same time. Printing units 18, 19, 20, 21 print on a substrate 16. Each printing unit 10 includes a plate cylinder 120 and a blanket cylinder 130. In other preferred embodiments, the printing press 100 may be non-perfecting web offset press.

Figure 3:
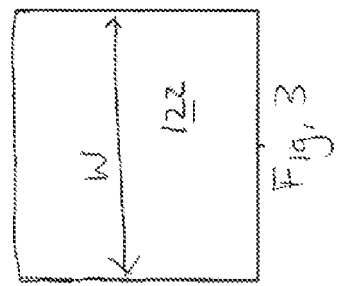
FIG. 3 shows a printing plate.
Figure 4:
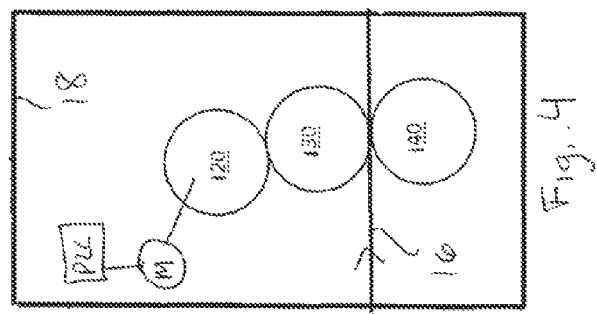
FIG. 4 shows a printing unit of the printing press shown in FIG. 1 in a throw-on position.
Figure 2:
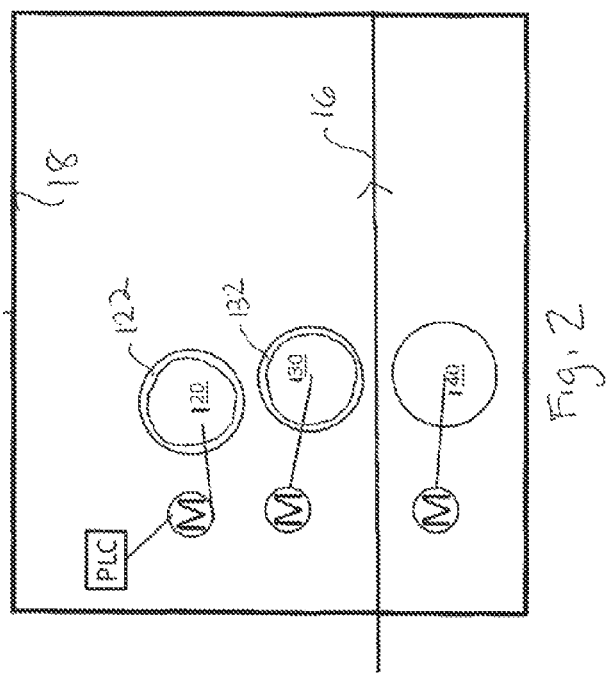
FIG. 2 shows a printing unit of the printing press shown in FIG. 1 in a throw-off position.

As shown in FIGS. 2 to 4, each plate cylinder 120 carries a printing plate 122 mounted thereon. The printing plates 122 may be secured to the plate cylinder 120 by devices known in the printing arts, for example, via reel rods or lock up slots. Each blanket cylinder 130 carries a printing blanket 132 mounted thereon. The blankets 130 may be sleeve shaped printing blankets. Each plate and blanket cylinder 120, 130 is connected to a motor M 126, 136, respectively. The torque of each plate cylinder motor is recorded, both when the plate cylinder is on impression, Ton (FIG. 4), and when the plate cylinder is off impression, Toff (FIG. 2).

The radius rp of printing plate 122 and the width W of the printing plate 122 are input into the control system. The nip force is then calculated: $Fp=-(Ton-Toff)/(rp \times W)$.

Since the desired nip force operating range is, for example, +/-4 pli with respect to the design setpoint, if Fp>design setpoint+4 pli or Fp<design setpoint-4 pli, the PLC will throw the subject printing unit off impression, stop the press, and post a fault message to the operator to replace the blanket.

Figure 5:
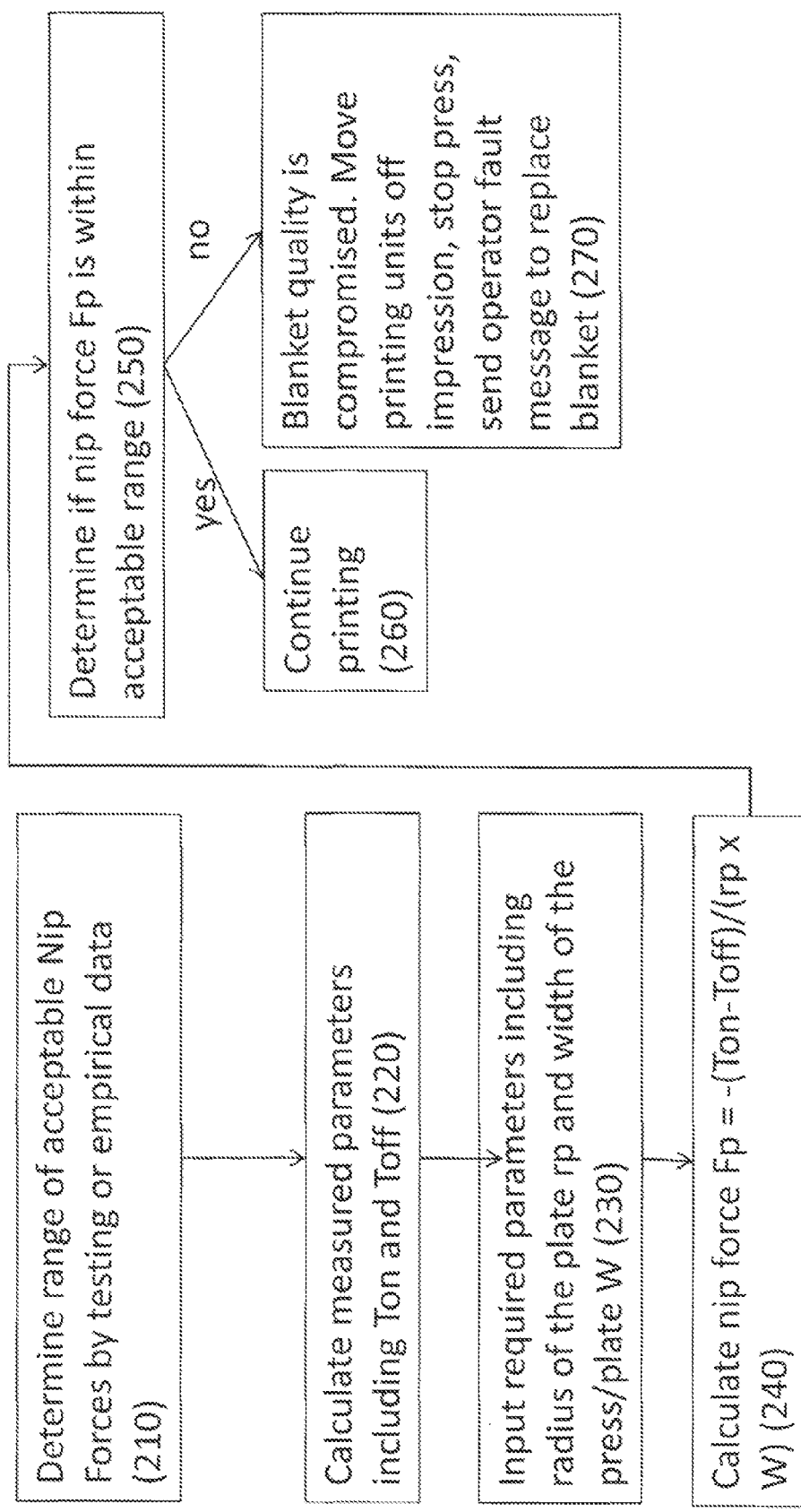
FIG. 5 is an illustrative flow chart for quantifying blanket performance in accordance with the present invention.

As shown in FIG. 5, the range of acceptable operating nip force is first determined by testing or an operator may rely on empirical data 210. The measured parameters, Ton and Toff, are made 220 and sent to the PLC. The required static input parameters including the radius of the plate rp and the width W of the plate or press are also entered into the PLC 230. The nip force Fp is then determined 240. The nip force is checked against the acceptable operating range 250. If the nip force Fp is within the desired operating range, the press may continue printing 260. If the nip force Fp is outside the desired operating range, the blanket quality may be compromised so the printing unit(s) are thrown off impression, the press is brought to a stop and the operator receives a fault message to change or remedy the blanket cylinder 270.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A method for determining blanket performance during operation of a printing press, the printing press including a plate cylinder having a printing plate transferring an image to a blanket on a blanket cylinder for printing on a substrate, the method comprising the steps of:
   determining an acceptable range of nip force between a plate cylinder and a blanket cylinder in a printing unit;
   calculating with a processor, the nip force (Fp) between the plate cylinder and blanket cylinder, wherein the nip force is calculated as a function of the plate radius (rp), printing plate width (W), on impression torque (Ton) and off impression torque (Toff); and
   controlling the printing press using the calculated nip force, wherein said controlling includes printing images on the substrate if the calculated nip force is within the acceptable range and further includes one or more of:
      stopping the press if the calculated nip force is outside of the acceptable range,
      displaying a fault message if the calculated nip force is outside of the acceptable range, and throwing off the first plate cylinder and first blanket cylinder if the nip force is outside the acceptable range.

2. The method as recited in claim 1 further comprising the steps of:
   measuring the printing plate radius (rp) and printing plate width (W); and wherein the step of calculating includes:
   measuring the torque of the plate cylinder when the plate cylinder and blanket cylinder are on impression (Ton); and
   measuring the torque of the plate cylinder when the plate cylinder and blanket cylinder are off impression (Toff).

3. The method as recited in claim 1, wherein the nip force is calculated using the following formula, $Fp=-(Ton-Toff)/(rp \times W)$.

4. The method as recited in claim 1 wherein the acceptable range of nip force is determined during testing.

5. The method as recited in claim 1 further comprising the step of:
   providing a design setpoint for a desired nip force in the printing press.

6. The method as recited in claim 5, wherein the design setpoint is -1 pli.

7. The method as recited in claim 3 wherein the acceptable range of nip force is +/-4 pli with respect to the design setpoint.

8. The method as recited in claim 1 wherein the acceptable range of nip force is $-4 \text{ pli} \leq Fp \leq 4$ pli.

9. The method as recited in claim 1 wherein the acceptable range of nip force is $-2 \text{ pli} \leq Fp \leq 0.25$ pli.

10. The method as recited in claim 1 wherein the acceptable range of nip force is $-1 \text{ pli} \leq Fp \leq 0$ pli.

11. The method as recited in claim 1 wherein the acceptable range of nip force is determined empirically.

12. The method as recited in claim 1 wherein if the calculated nip force is outside of the acceptable range, the printing press moves into a throw off position.

13. A printing press comprising:
   a plate mounted on a plate cylinder driven by a first motor;
   a blanket mounted on a blanket cylinder;
   a controller calculating a nip force between the blanket cylinder and plate cylinder;
   the controller throwing off the first plate cylinder and first blanket cylinder in response to the calculated nip being outside a predetermined range;
   wherein the controller determines torque values of the first motor when the plate cylinder is on impression and when the plate cylinder is off impression; and
   wherein the controller calculates the nip force as a function of a radius of the printing plate (rp), a width of the printing plate (W), and torque values of the first motor when the plate cylinder is on impression (Ton) and off impression (Toff).

14. The printing press recited in claim 13 wherein the nip force Fp is calculated using the following formula: $Fp=-(Ton-Toff)/(rp \times W)$.

15. The printing press recited in claim 13 wherein the predetermined range of nip force is +/-4 pli with respect to a design setpoint.

* * * * *